United States Patent [19]
Ho et al.

[11] Patent Number: 6,021,412
[45] Date of Patent: *Feb. 1, 2000

[54] METHOD AND SYSTEM FOR AUTOMATICALLY ADDING GRAPHICS TO A DOCUMENT TO ILLUSTRATE CONCEPTS REFERRED TO THEREIN

[75] Inventors: Rosanna Ho, Foster; Robert Parker, Cupertino, both of Calif.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/624,353

[22] Filed: Apr. 2, 1996

[51] Int. Cl.$^7$ ..................................................... G06F 17/30
[52] U.S. Cl. .............................. 707/104; 707/3; 707/500
[58] Field of Search ..................................... 395/776, 777, 395/784, 759, 615; 707/104, 514, 515, 522, 3–6, 500; 345/302

[56] References Cited

U.S. PATENT DOCUMENTS

| | | | |
|---|---|---|---|
| Re. 33,316 | 8/1990 | Katsuta et al. | 395/128 |
| 4,905,163 | 2/1990 | Garber et al. | 395/63 |
| 5,099,426 | 3/1992 | Carlgren et al. | 395/759 |
| 5,122,951 | 6/1992 | Kamiya | 395/759 |
| 5,404,435 | 4/1995 | Rosenbaum | 395/777 |
| 5,493,677 | 2/1996 | Balogh et al. | 395/615 |
| 5,500,936 | 3/1996 | Allen et al. | 395/348 |
| 5,625,810 | 4/1997 | Kurosu et al. | 395/601 |
| 5,630,121 | 5/1997 | Braden-Harder et al. | 395/604 |
| 5,659,742 | 8/1997 | Beattie et al. | 395/615 |

OTHER PUBLICATIONS

Poor, "Working with words", *Computer Shopper*, v. 14, n. 12, p. 829(2), Dec. 1994.
Scisco, "Design tools for the rest of us: personal creativity software", *PC Magazine*, v. 14, n. 13, p. 473(3), Jul. 1995.
Holzberg, "Adobe goes home with Paint & Publish Deluxe", *Computer Shopper*, v. 15, n. 6, p. 520, Jun. 1995.
Microsoft Creative Writer poster, p. 3, Jan. 1994.
Microsoft Creative Writer screen displays, pp. 1–2, Jan. 1994.

*Primary Examiner*—Joseph H. Feild
*Attorney, Agent, or Firm*—Ronald M. Anderson

[57] ABSTRACT

A method and system for automatically adding graphics to a document to illustrate concepts referred to therein is provided. The method and system selects an instance of graphics illustrating concepts expressed by an input word in the document from among instances of graphics, at least a portion of which have associated with them one or more words characterizing their subject. The method and system further utilizes a list of words, each representing a concept. The method and system first determines whether the input word is among the list of words that each represent a concept. If the input word is among the list of words that each represent a concept, the method and system identifies an instance of graphics having associated with it the input word. The method and system then selects the identified instance of graphics.

34 Claims, 17 Drawing Sheets

| | concept matching word (651) | concept lemma (652) | representative concept synonym (653) |
|---|---|---|---|
| 601 | shock | shock | surprise |
| 602 | shocked | shock | surprise |
| 603 | shocking | shock | surprise |
| 604 | shocks | shock | surprise |
| 605 | surprise | surprise | surprise |
| 606 | surprises | surprise | surprise |
| 607 | surprised | surprise | surprise |
| 608 | surprising | surprise | surprise |
| 609 | leader | leadership | leadership |
| 610 | leaders | leadership | leadership |
| 611 | leadership | leadership | leadership |
| | . | . | . |
| | . | . | . |
| | . | . | . | concept table 60

Fig. 6

| | concept matching word | concept lemma | representative concept synonym |
|---|---|---|---|
| 601 | shock | shock | surprise |
| 602 | shocked | shock | surprise |
| 603 | shocking | shock | surprise |
| 604 | shocks | shock | surprise |
| 605 | surprise | surprise | surprise |
| 606 | surprises | surprise | surprise |
| 607 | surprised | surprise | surprise |
| 608 | surprising | surprise | surprise |
| 609 | leader | leadership | leadership |
| 610 | leaders | leadership | leadership |
| 611 | leadership | leadership | leadership |
| | ... | ... | ... | concept table 600 — 651 concept matching word, 652 concept lemma, 653 representative concept synonym

METHOD AND SYSTEM FOR AUTOMATICALLY ADDING GRAPHICS TO A DOCUMENT TO ILLUSTRATE CONCEPTS REFERRED TO THEREIN

TECHNICAL FIELD

The invention relates generally to a method and system for automatic document augmentation, and, more specifically, to a method and system for automatically adding graphics to a document to illustrate concepts referred to therein.

BACKGROUND OF THE INVENTION

Application programs are currently available that allow a computer user to prepare a visual presentation, or a "slide show," comprised of a series images called "slides" that each contain text and/or graphics. Such application programs enable a user who is not a professional author or graphic design artist to design a professional-looking visual presentation that can accompany and enhance a verbal presentation, or that may stand on its own.

When a user prepares a document, such as a visual presentation, for others, the inclusion of instances of graphics that represent concepts addressed in the document can be a powerful communicative tool for conveying those concepts. Unfortunately, even when an extensive graphics library containing images and video sequences is available, a typical user is often unable to select instances of graphics that represent concepts that the user wishes to convey in the document. For example, while an experienced author might add an image of a tortoise to a slide containing a passage of text describing a slow-moving process in order to emphasize the concept of slowness expressed by the text, this process can be nonintuitive and inefficient for typical users.

SUMMARY OF THE INVENTION

The present invention provides a method and system for automatically adding graphics to a document to illustrate concepts referred to therein. In a preferred embodiment, an automatic software facility for adding relevant instances of graphics to a presentation document ("the facility") is included as part of an application program for generating presentation documents. Such instances of graphics may include both static images and video clips. The instances of graphics which may be added to a presentation document by the facility are preferably stored in a graphics library. The graphics library preferably facilitates the storage of one or more descriptive words describing the content of each instance of graphics stored in the graphics library. The facility facilitates the illustration of any words in the presentation document referring to concepts. As is described below, the facility preferably identifies words in the document representing concepts to be illustrated in several different ways. Once a word is identified for illustration, the facility preferably compares it to a list of concept matching words corresponding to common references to concepts. A representative concept synonym corresponding to one of the descriptive words stored for the instances of graphics stored in the graphics library is preferably specified for each listed concept matching word, such that several different concept matching words may map to the same representative concept synonym. If the identified word matches one of the concept matching words, the facility searches the graphics library for instances of graphics having a descriptive word matching the representative concept synonym for the matched concept matching words. The facility then preferably displays small thumbnail versions of the instances of graphics having a descriptive word matching the representative concept synonym for the matched concept matching words, and allows the user to select one or more thumbnails in order to insert the corresponding instances of graphics in the document.

BRIEF DESCRIPTION OF THE DRAWINGS

FIG. 6 is a table diagram showing the contents of a sample concept table.

DETAILED DESCRIPTION OF THE INVENTION

Figure 1:
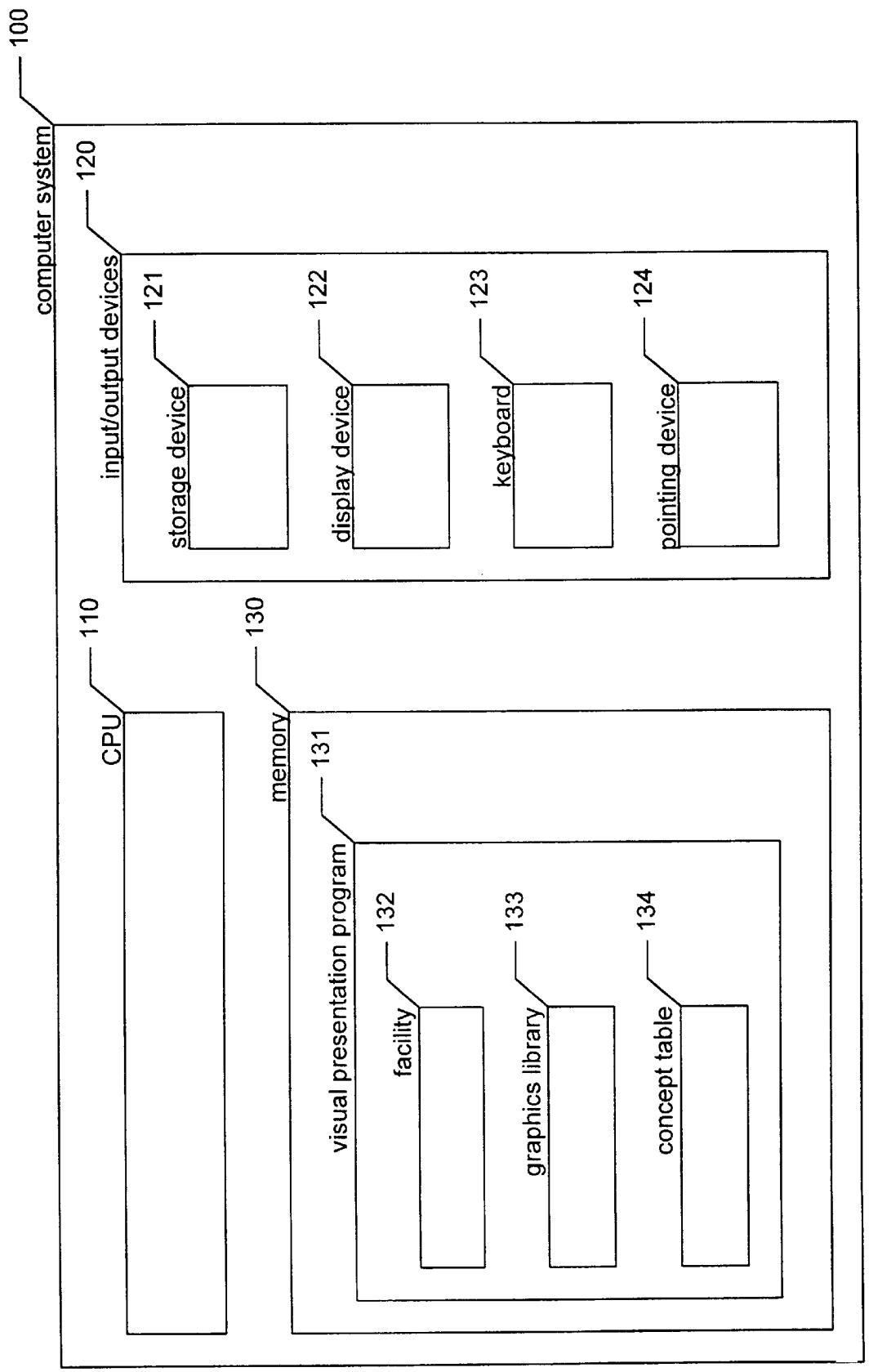
FIG. 1 is a high-level block diagram of the general-purpose computer system upon which the facility preferably operates.

A method and system for automatically adding graphics to a document to illustrate concepts referred to therein is provided. While the discussion that follows addresses the use of the present invention to add instances of graphics to a document, those skilled in the art will recognize that the present invention may be used to add multimedia artifacts of many types to a document, including audio sequences and holograms. In a preferred embodiment, an automatic software facility for adding relevant instances of graphics to a presentation document ("the facility") is included as part of an application program for generating presentation documents. Such instances of graphics may include both static images and video clips. The instances of graphics which may be added to a presentation document by the facility are preferably stored in a graphics library. The graphics library preferably facilitates the storage of one or more descriptive words describing the content of each instance of graphics stored in the graphics library. As is described below, the facility preferably identifies words in the document representing concepts to be illustrated in several different ways. Once a word is identified for illustration, the facility preferably compares it to a list of concept matching words corresponding to common references to concepts. A representative concept synonym corresponding to one of the descriptive words stored for the instances of graphics stored in the graphics library is preferably specified for each listed concept matching word, such that several different concept matching words may map to the same representative concept synonym. If the identified word matches one of the concept matching words, the facility searches the graphics library for instances of graphics having a descriptive word matching the representative concept synonym for the matched concept matching words. The facility then preferably displays small thumbnail versions of the instances of graphics having a descriptive word matching the representative concept synonym for the matched concept matching words, and allows the user to select one or more thumbnails in order to insert the corresponding instance of graphics in the document.

The present invention encompasses several embodiments for identifying words in the document representing concepts to be illustrated, one or more of which may be employed to identify words in the document representing concepts to be illustrated. In a first preferred embodiment, the facility examines all of the words occurring anywhere in the presentation document that match one of the concept matching words in response to an explicit request from the user to do so. In this embodiment, the facility preferably displays a list of words occurring anywhere in the presentation document that match one of the concept matching words and allows the user to select one of the listed words to add an instance of graphics to the document illustrating the concept referred to by the selected word. In a second preferred embodiment, the facility examines the words occurring on the current slide of the document when the user requests to move to a different slide. In this embodiment, the facility preferably searches for words on the current slide that match one of the concept matching words and allows the user to add an instance of graphics to the document illustrating the concept referred to by each such word. In a third preferred embodiment, the facility examines words occurring in the document when the computer system's microprocessor is idle. In this embodiment, the facility preferably uses otherwise unused microprocessor cycles to search for words in the document that match one of the concept matching words and allows the user to add an instance of graphics to the document illustrating the concept referred to by each such word. In a fourth preferred embodiment, the facility examines each word in the document as it is inputted by the user. In this embodiment, after the user has inputted a word, the facility compares the inputted word to the concept matching words and allows the user to add an instance of graphics illustrating the concept referred to by the inputted word.

FIG. 1 is a high-level block diagram of the general-purpose computer system upon which the facility preferably operates. The computer system 100 contains a central processing unit (CPU) 110, input/output devices 120, and a computer memory (memory) 130. Among the input/output devices are a storage device 121, such as a hard disk drive; a display device 122, such as a video monitor; a keyboard 123; and a pointing device 124, such as a mouse. The memory 130 preferably contains a graphics presentation program 131 for designing and presenting visual presentations. The graphics presentation program 131 preferably includes the graphics adding facility (the facility) 132, a graphics library 133 containing instances of graphics that may be added by the facility each having descriptive words stored for them describing their content, and a concept table 134 for mapping from words found in a presentation document to the conceptual descriptive words stored for the instances of graphics stored in the graphics library. In alternative embodiments, the facility or the graphics library may, in whole or part, be provided separately from the presentation program, such as in a macro or an external library. While the facility is preferably implemented on a computer system configured as described above, one skilled in the art will recognize that it may also be implemented on computer systems having different configurations.

Figure 2:
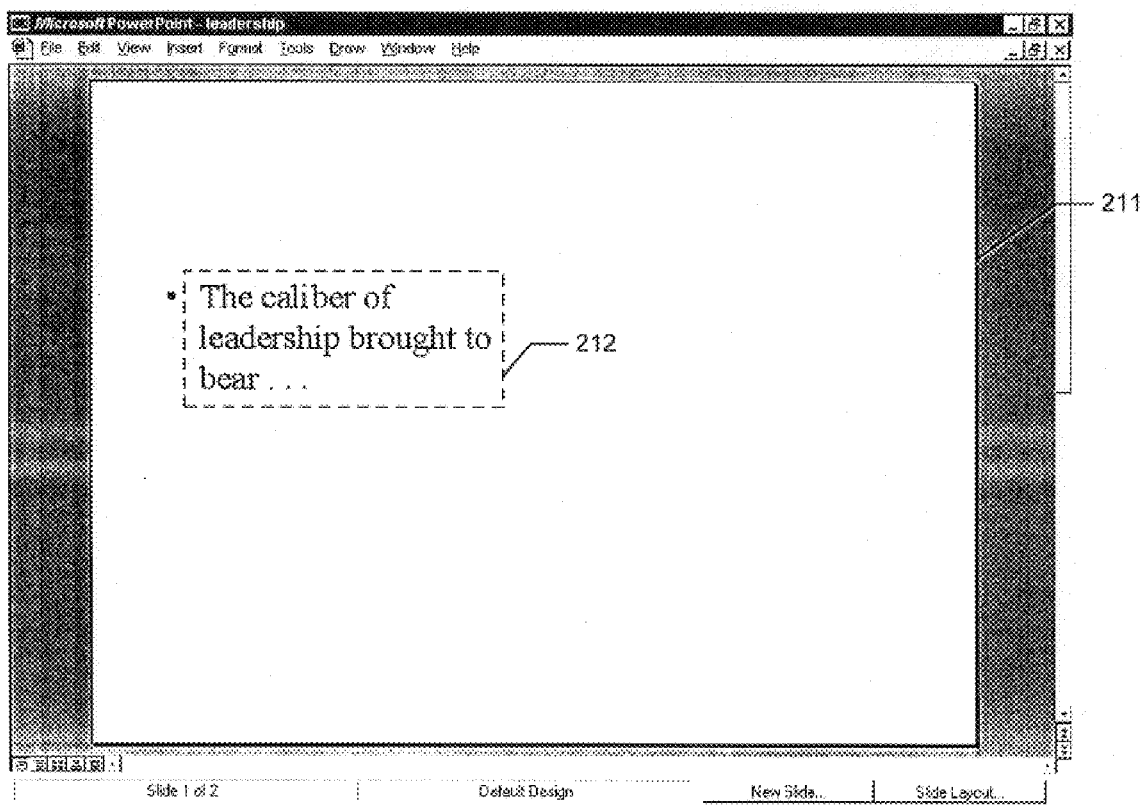
FIG. 2 is a screen diagram showing the preparation of a first slide of the presentation document.
Figure 3:
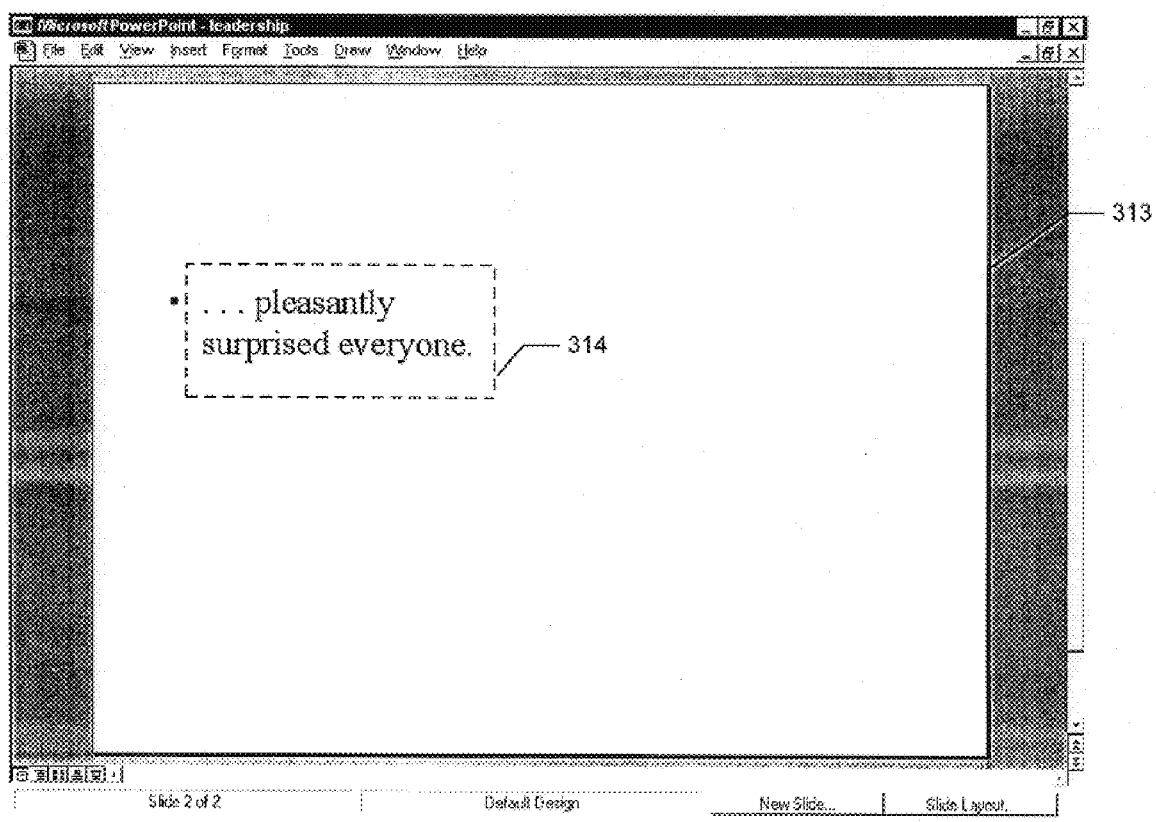
FIG. 3 is a screen diagram showing the preparation of a second slide of the presentation document.

Preferred embodiments of the invention are described below with respect to a sample presentation document. FIGS. 2 and 3 show a user preparing the text of a presentation document. FIG. 2 is a screen diagram showing the preparation of a first page, or "slide," of the presentation document. The contents of the first slide 211 show that the user has typed a block of text 212 containing the words "The caliber of leadership brought to bear . . . " FIG. 3 is a screen diagram showing the preparation of a second slide of the presentation document. The contents of the second slide 313 show that the user has typed a block of text 314 contains the words ". . . pleasantly surprised everyone."

Figure 4:
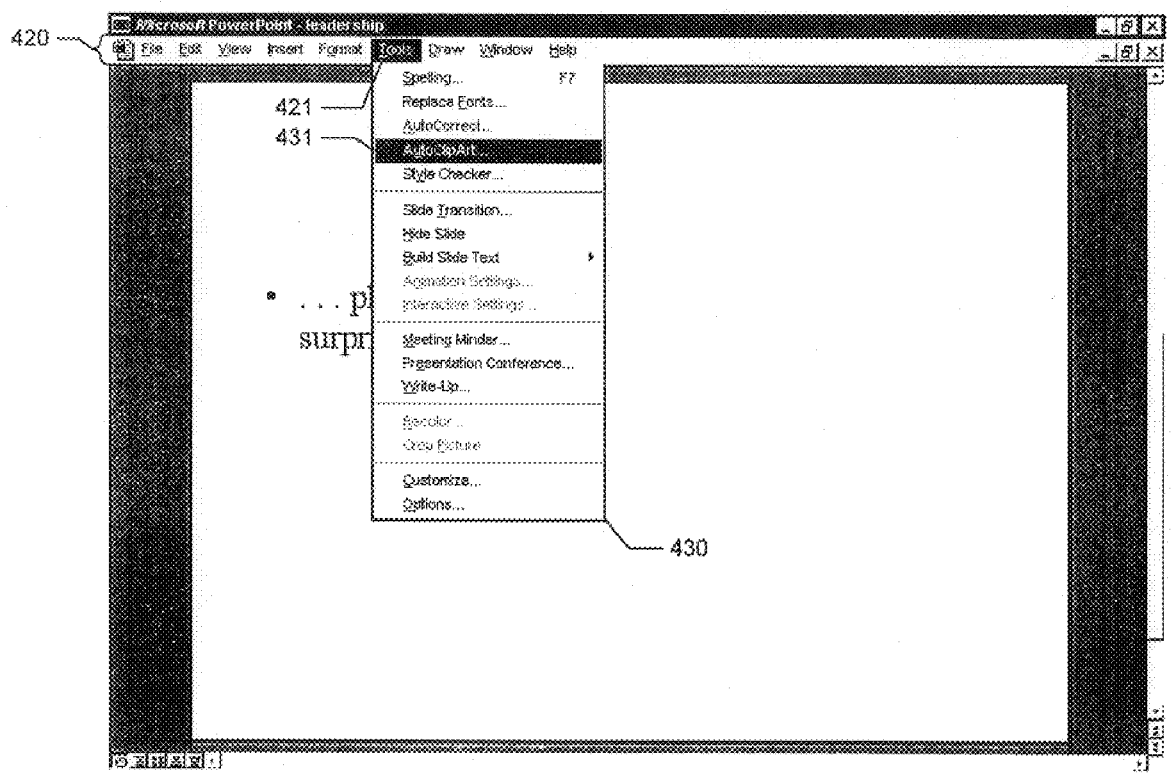
FIG. 4 is a screen diagram showing the user invoking the facility to automatically add conceptually relevant instances of graphics to the sample document.

FIG. 4 is a screen diagram showing the user invoking the facility to automatically add conceptually relevant instances of graphics to the sample document. The user has selected a "Tools" menu title 421 from menu bar 420. In response, the graphics presentation program has displayed Tools menu 430. Finally, the user has selected an "AutoClipArt" menu item 431 to invoke the facility. According to additional preferred embodiments, the facility can be invoked in a number of other ways, including a combination of keystrokes or a voice command.

Figure 5:
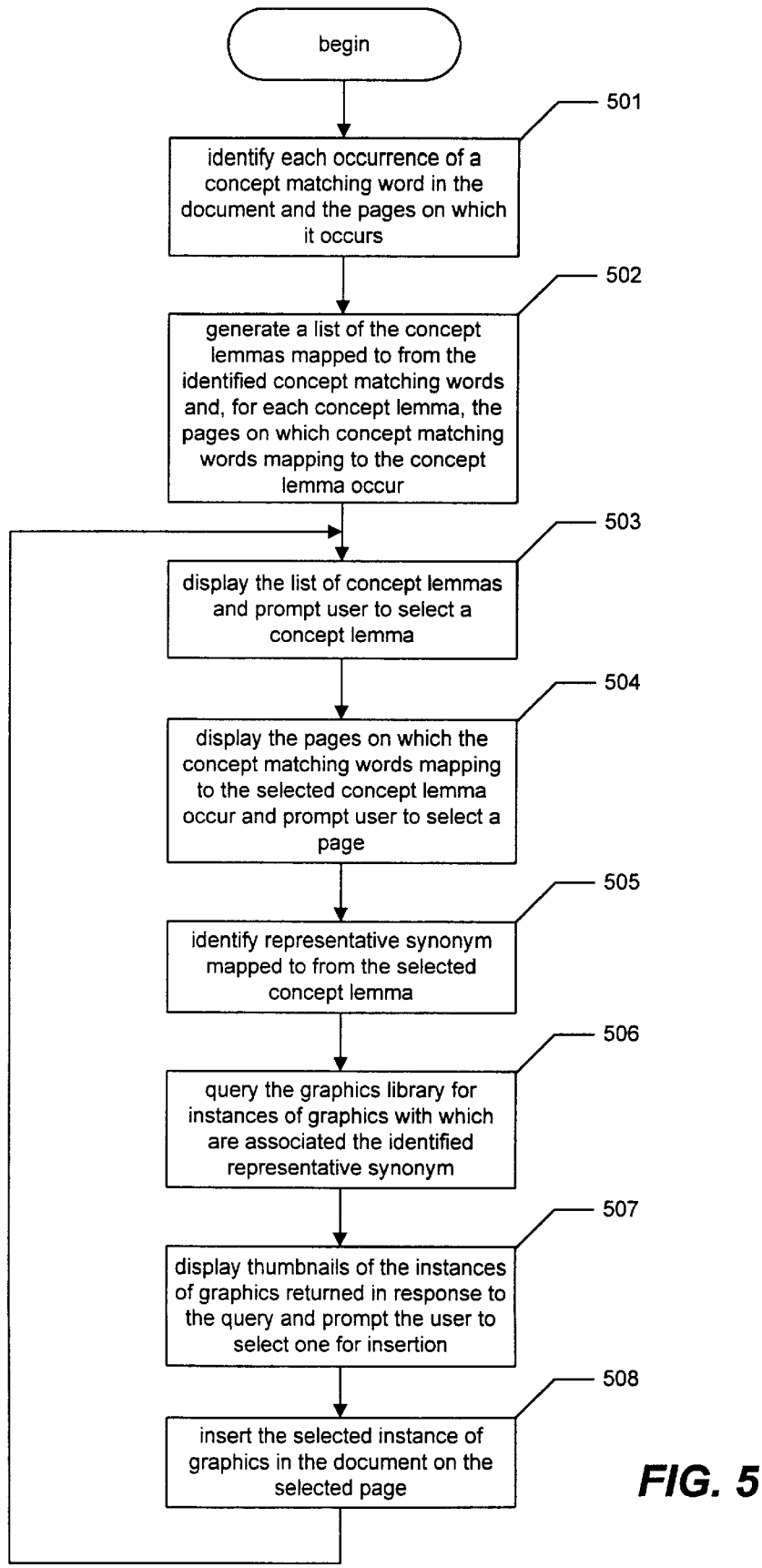
FIG. 5 is a flow diagram showing the steps preferably performed by the facility when it is invoked as described above to automatically add conceptually relevant graphics a presentation document.

FIG. 5 is a flow diagram showing the steps preferably performed by the facility when it is invoked as described above to automatically add conceptually relevant graphics to a presentation document. The steps shown in FIG. 5 utilize a concept table to map from words occurring in the presentation document to conceptual descriptive words stored for instances of graphics in the graphics library. FIG. 6 is a table diagram showing the contents of a sample concept table. The concept table 600 is comprised of rows (e.g., 601–611) each corresponding to one concept matching word that may appear in the presentation document. Each row is divided into three columns: a concept matching word column 651 that contains the concept matching word for the row; a concept lemma column 652, which contains the lemma or root form of the concept matching word for the row; and a representative concept synonym column 653 containing a representative concept synonym that represents the concept lemma from the row as well as other synonymous concept lemmas, and which corresponds to a descriptive word stored for one or more of the instances of graphics in the graphics library. For example, the concept matching word for row 606 is "surprised." The concept lemma for this concept matching word is "surprise," as is the representative concept synonym for this concept matching word that will be searched for in the graphics library by the facility when illustrating the concept matching word "surprised." The user is preferably able to modify the contents of the concept table, in that the user is able to delete an existing row, add a new row, or change the contents of one or more columns of the row to change the way in which the facility searches for concept words in the document to illustrate.

Returning to FIG. 5, in step 501, the facility identifies each occurrence in the document of a concept matching word occurring in column 651 (FIG. 6), and identifies the slides on which the concept matching word occurs. In step 502, the facility generates a list of the concept lemmas for the identified concept matching words, and for each such concept lemma, the slides on which the concept matching words that map to the concept lemma occur. Table 1 below shows the list of concept lemmas and slide numbers generated by the facility in step 502 for the sample presentation document shown in FIGS. 2 and 3 using the sample concept table shown in FIG. 6.

TABLE 1

| Concept Lemmas | Slide Numbers |
| --- | --- |
| Leadership | 1 |
| Surprise | 2 |

Figure 7:
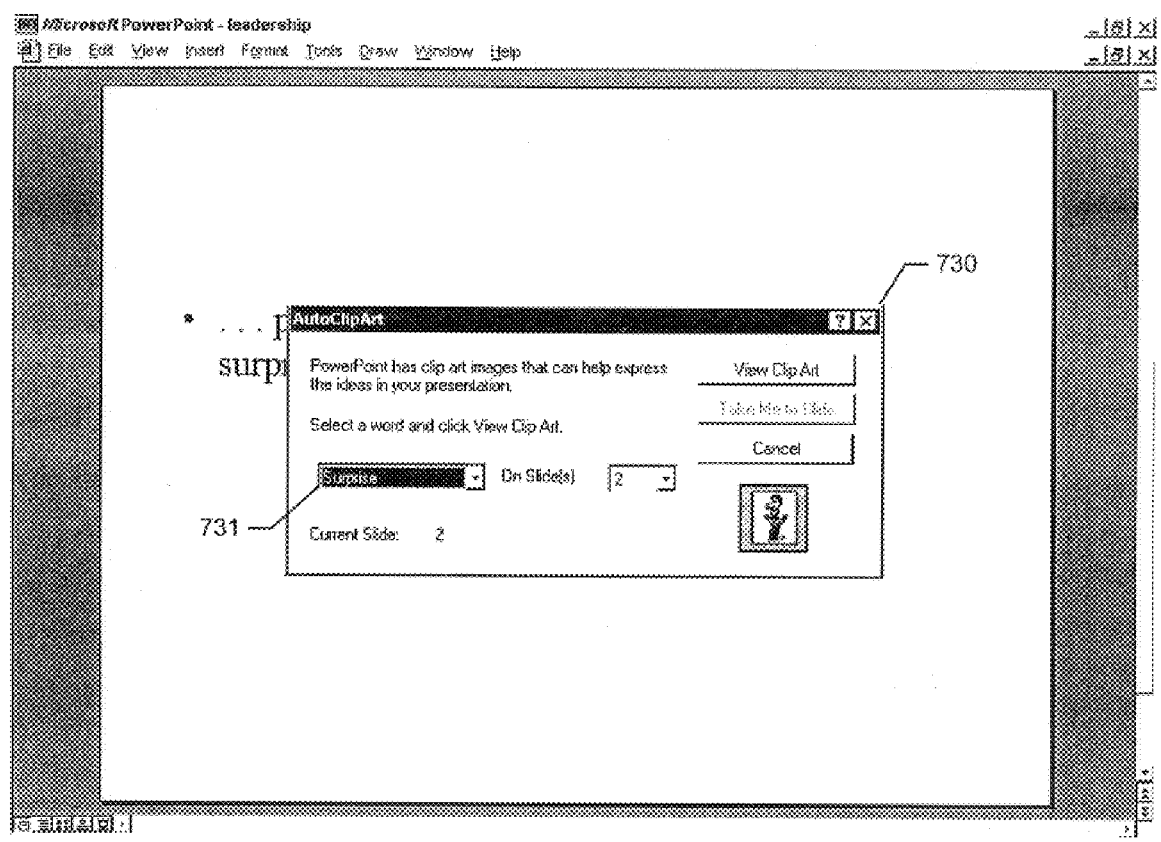
FIG. 7 is a screen diagram showing a word selection window used by the facility to display the list of lemmas generated in step 503.
Figure 8:
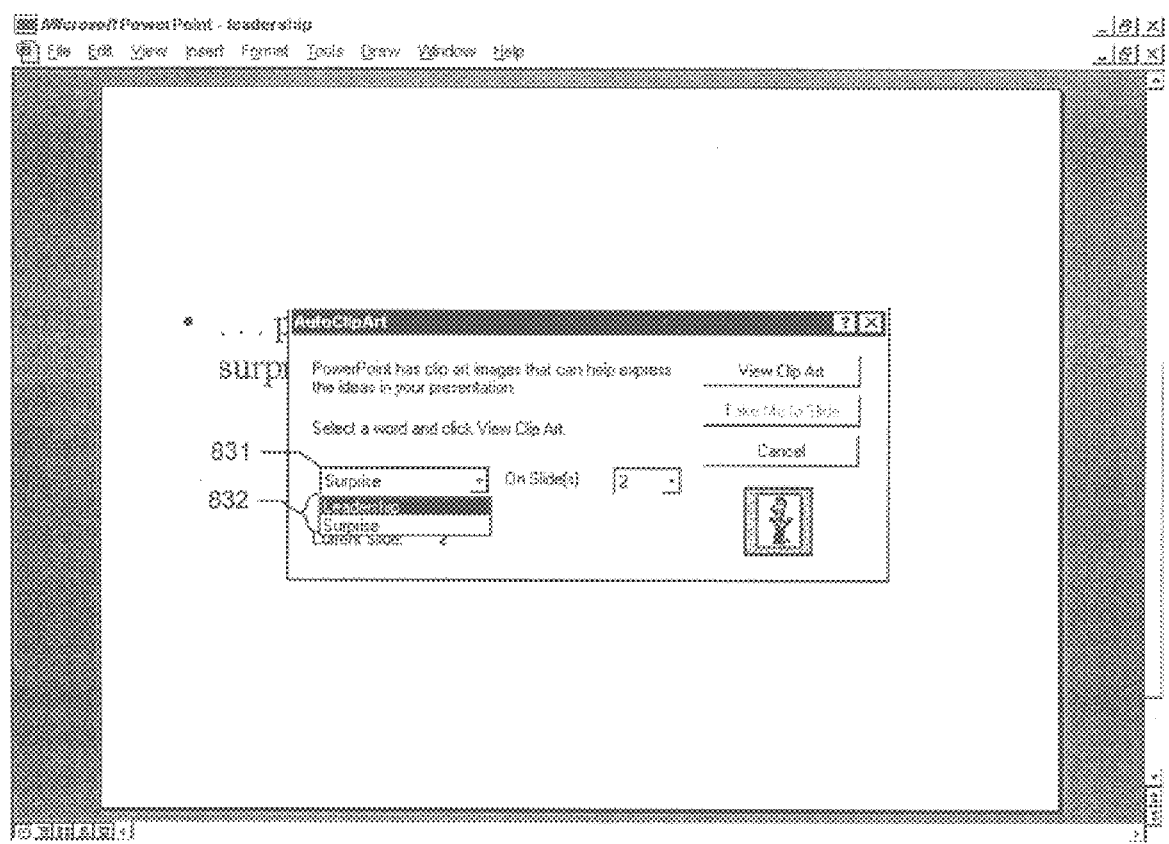
FIG. 8 is a screen diagram showing the user selecting a concept lemma from a list of concept lemmas.
Figure 9:
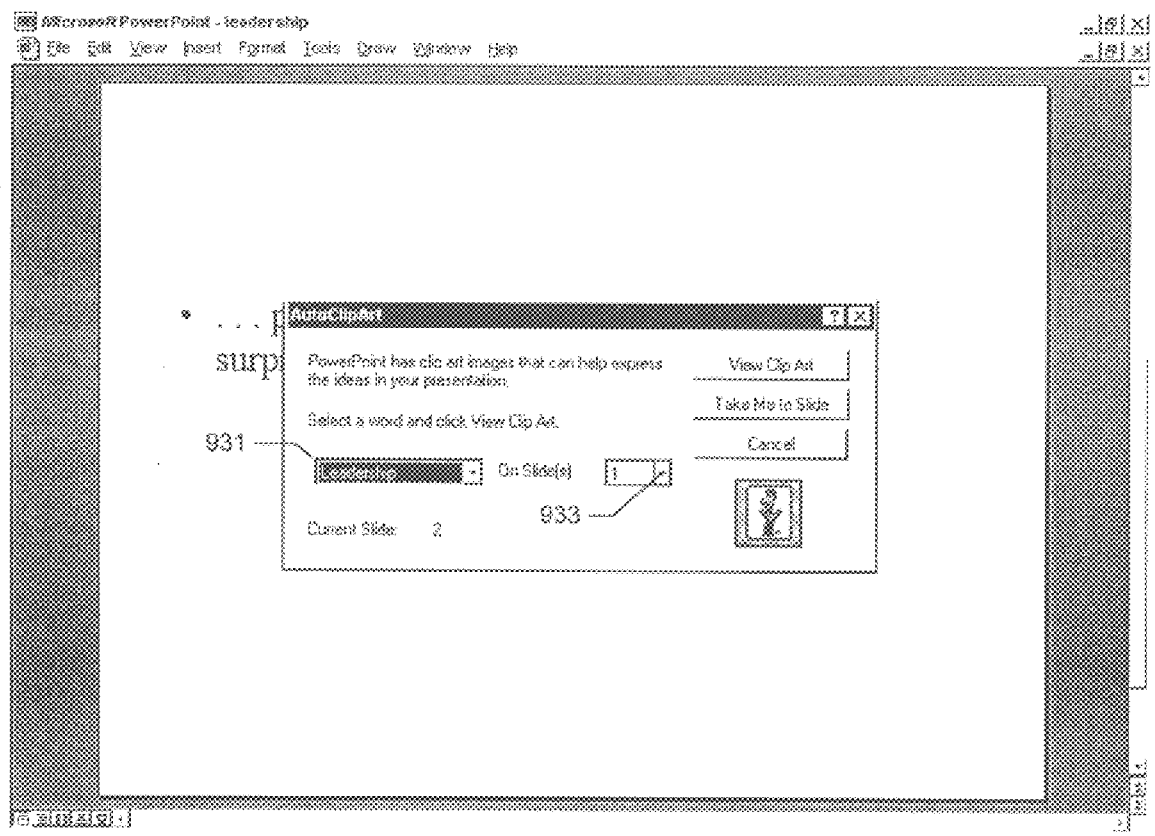
FIG. 9 is a display diagram showing that the user has selected a concept lemma "Leadership" using the word/selection field.

In step 503, the facility displays the list of concept lemmas and prompts the user to select a concept lemma. FIGS. 7, 8, and 9 are screen diagrams showing the facility's performance of step 503. FIG. 7 is a screen diagram showing a word selection window used by the facility to display the list of lemmas generated in step 503. The word selection window 730 contains a word field 731 that the user can use to select one concept lemma to illustrate from the list of concept lemmas.

FIG. 8 is a screen diagram showing the user selecting a concept lemma from a list of concept lemmas. By clicking on the word selection field 831, the user has caused the facility to display a list of concept lemmas 832. The user has further used the pointing device or the keyboard to select the "Leadership" concept lemma from a list of concept lemmas 832. FIG. 9 is a display diagram showing that the user has selected the "Leadership" concept lemma using the word selection field 932.

Returning to FIG. 5, in step 504, the facility displays the slides on which the concept matching words mapping to the selected concept lemma occur and prompts the user to select one of these slides as the one at which an instance of graphics will be inserted in the document. In this example, as can be seen from Table 1, the concept matching words that map to the selected concept lemma "Leadership" occurs only on slide 1. If the concept matching words mapping to the selected concept lemma occurred on more than one slide, the user could click on the slide selection field 933 to select one of the slides on which the concept matching words mapping to the selected concept lemma occur. In this example, however, because the concept matching words mapping to the selected concept lemma occur only on a single slide, the incidence of graphics inserted by the facility for this concept lemma will be inserted at slide 1. In an alternative embodiment, the user may use the facility to insert an instance of graphics for illustrating the selected concept on any slide, and is not limited to the slides on which the selected concept lemma occurs. In step 505, the facility uses the concept table to identify the representative synonym mapped to from the selected concept lemma. In step 506, the facility queries the graphics library for instances of graphics with which are associated the representative synonym identified in step 505. In this example, the facility queries the graphics library for instances of graphics for which is stored the descriptive word "Leadership," the representative concept synonym of row 607 of the sample concept table.

Figure 10:
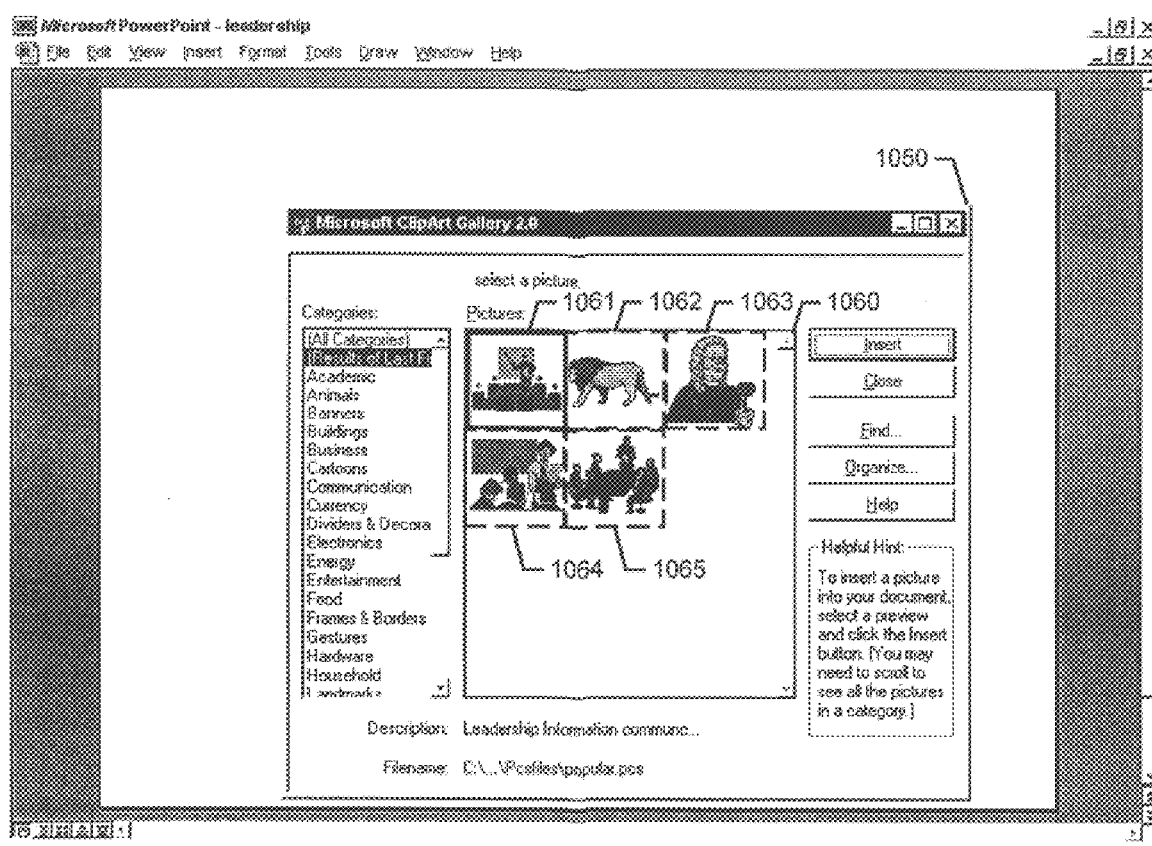
FIG. 10 is a display diagram showing the display of thumbnails of the instances of graphics returned in response to the query of the graphics library.
Figure 11:
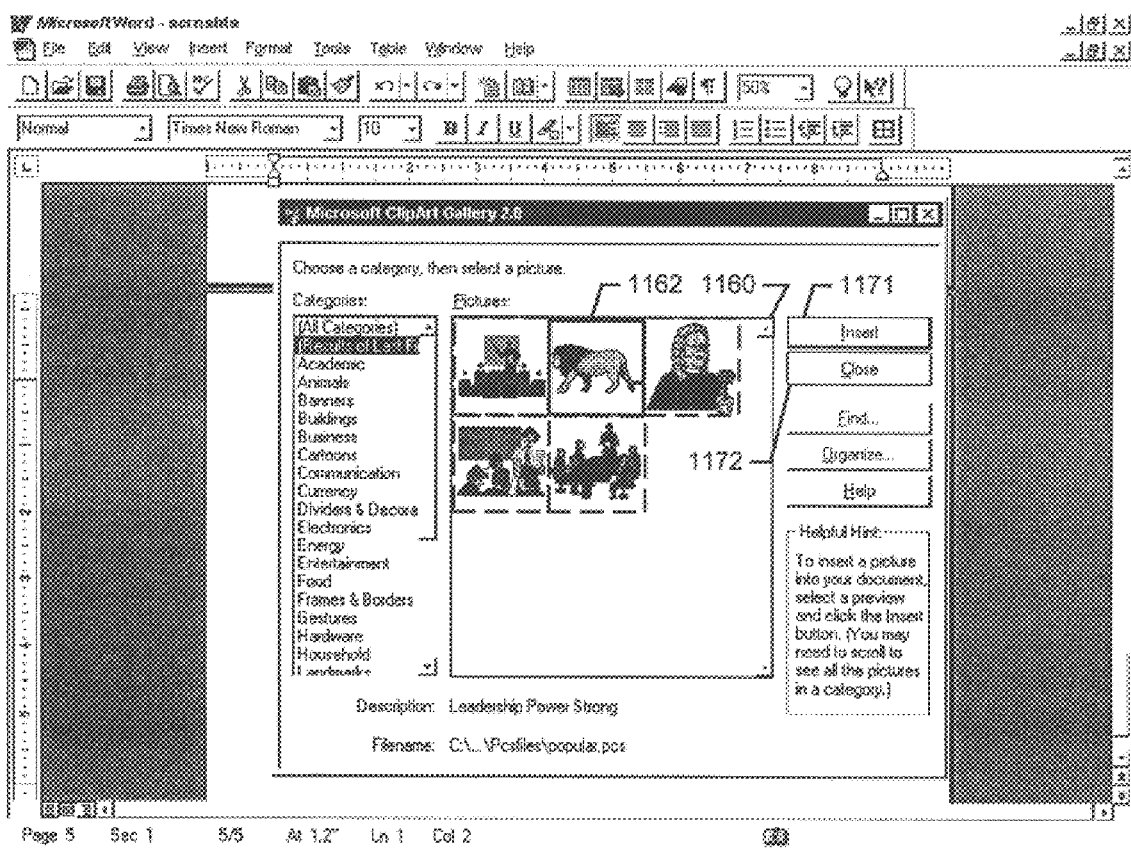
FIG. 11 is a screen diagram showing the user selecting an instance of graphics for insertion in the presentation document.

In step 507, the facility displays thumbnail versions of the instances of graphics returned in response to the query performed in step 506 and prompts the user to select one of the images for insertion. FIGS. 10 and 11 are display diagrams showing the facilities performance of step 507. FIG. 10 is a display diagram showing the display of thumbnails of the instances of graphics returned in response to the query of the graphics library. A graphics insertion window 1050 contains a search results window 1060. The search results window 1060, in turn, contains thumbnail versions 1061–1065 of the five instances of graphics returned in response to the graphics library query. Each of the five instances of graphics represented by thumbnails 1060–1065 have the descriptive word "Leadership" stored for them in the graphics library. For example, thumbnails 1061 and 1065 show the leaders of business meetings; thumbnail 1062 shows a mature male lion, the leader of a pride of lions; thumbnail 1063 shows a judge, the leader of judicial legal proceedings; and thumbnail 1064 shows a teacher, the leader of a class. In response to this display, the user can select one of the thumbnails 1061–1065 to have a corresponding instance of graphics inserted on slide 1 of the presentation.

FIG. 11 is a screen diagram showing the user selecting an instance of graphics for insertion in the presentation document. The diagram shows that the user has selected the lion thumbnail 1162 from the search results window 1160. The user may preferably cause the facility to insert the lion instance of graphics corresponding to the lion thumbnail 1162 by either using the pointing device to double click the lion thumbnail 1162, or by using the pointing device or the keyboard to select the insert button 1171 once the lion thumbnail 1162 is selected. If, on the other hand, the user does not wish to insert any instance of graphics, the user may use the pointing device or the keyboard to select the close button 1172.

Returning to FIG. 5, in step 508, the facility inserts the selected instance of graphics in the presentation document on the slide selected in step 504. After step 508, the facility preferably continues at step 503 to allow the user to select another concept lemma.

Figure 12:
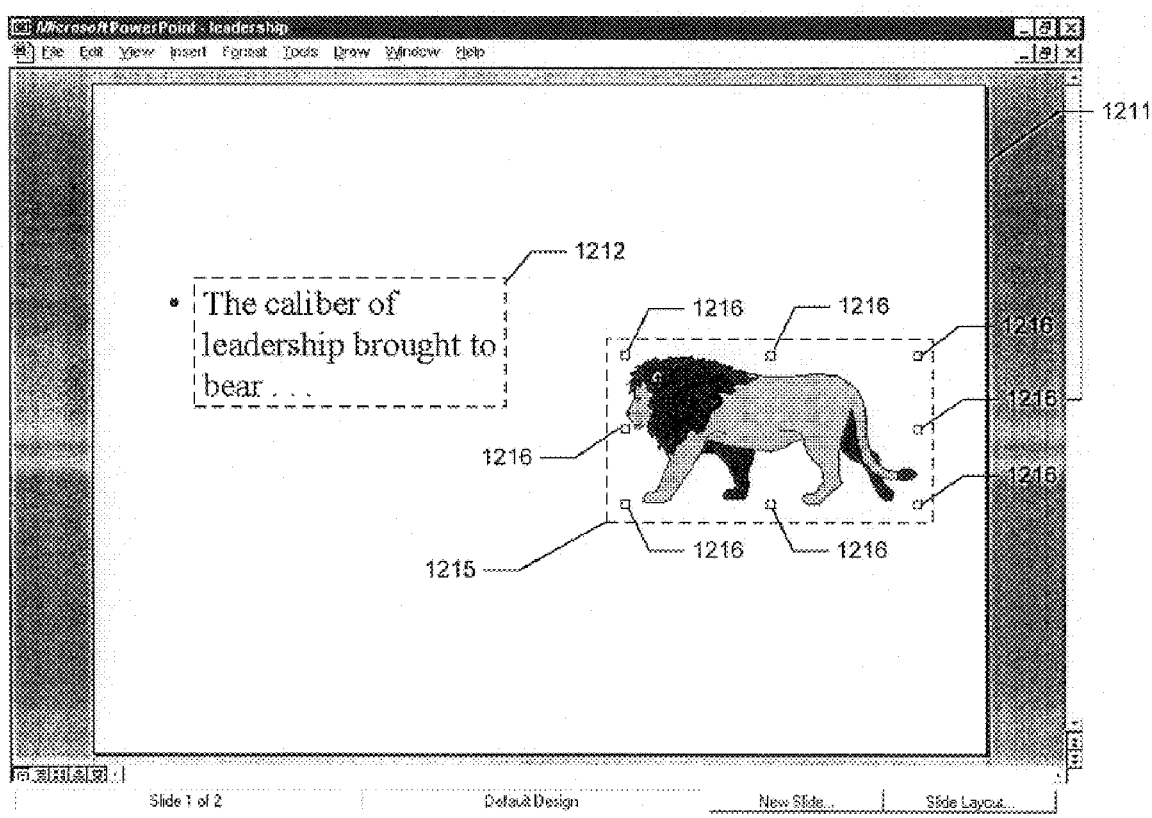
FIG. 12 is a screen diagram showing the insertion of the selected instance of graphics in a presentation document.

FIG. 12 is a screen diagram showing the insertion of the selected instance of graphics in a presentation document. The facility has inserted the lion instance of graphics 1215 from the graphics library onto the first slide 1211 of the presentation document. The user may preferably use the pointing device to drag the lion instance of graphics 1215 to any desired position on the slide. The user may also preferably use handles 1216 to resize the lion instance of graphics 1215 in either or both dimensions. The process of identifying and inserting an instance of graphics for a concept matching word occurring in the document described above may preferably be repeated by the user as many times as desired.

In additional preferred embodiments, the facility employs different procedures for identifying words in the document representing concepts to be illustrated. In one such embodiment, the facility examines the words occurring on the current slide of the document when the user requests to move to a different slide. In another such embodiment, the facility examines words occurring in the document at times when the computer system's microprocessor is idle.

Figure 13:
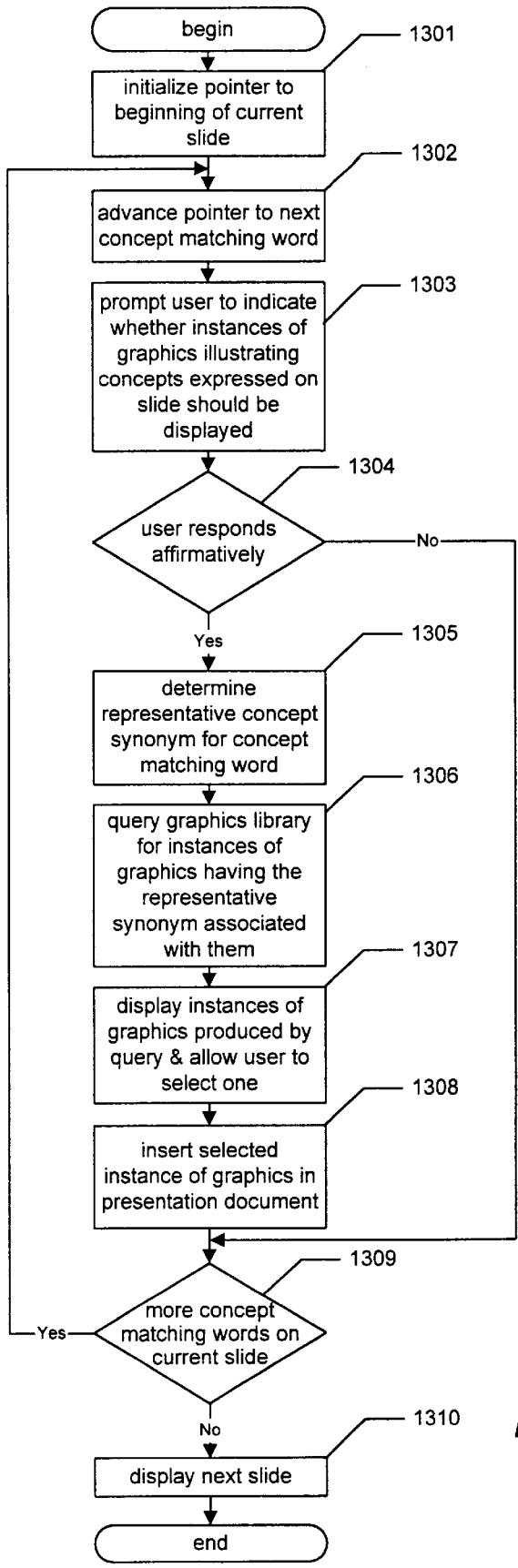
FIG. 13 is a flow diagram showing the steps preferably performed by the facility in the embodiment in which the facility examines the words occurring on the current slide of the document when the user requests to move to a different slide.
Figure 14:
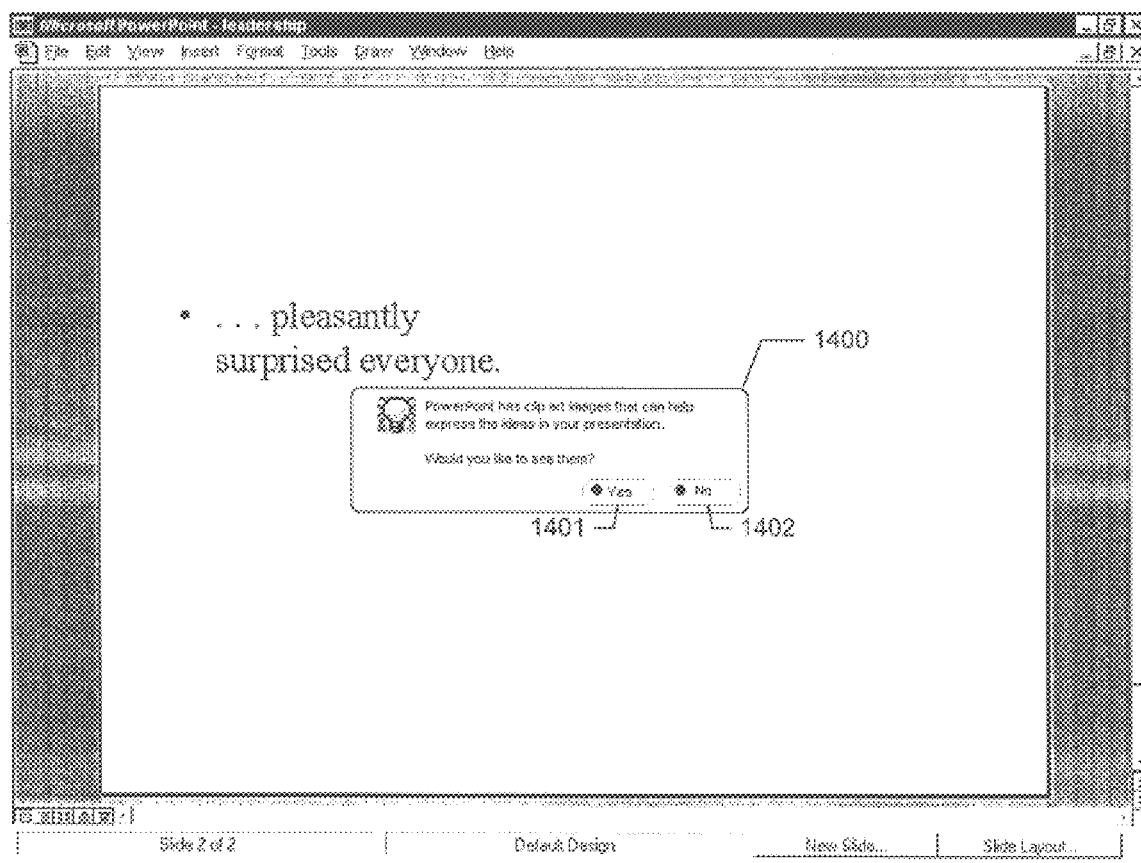
FIG. 14 is a screen diagram showing the facility prompting the user to indicate whether instances of graphics illustrating concepts expressed in the document should be displayed.

FIG. 13 is a flow diagram showing the steps preferably performed by the facility in the embodiment in which the facility examines the words occurring on the current slide of the document when the user requests to move to a different slide. The facility preferably performs these steps each time the user requests to move to a different slide of the document. Those skilled in the art will recognize a general correspondence between the steps shown in FIG. 13 and those shown in FIG. 5. In step 1301, the facility initializes a pointer to the beginning of the current slide. The facility uses this pointer to keep track of the words on the current slide of the document that have already been searched for concept matching words. In step 1302, the facility advances the pointer to the next concept matching word on the current slide after the present position on the pointer. In step 1303, the facility prompts the user to indicate whether instances of graphics illustrating concepts expressed in the document should be displayed. FIG. 14 is a display diagram showing a prompt dialog preferably displayed by the facility in step 1303. The prompt dialog 1400 contains an indication that instances of graphics illustrating concepts expressed in the document are available. The prompt dialog 1400 further contains buttons 1401 and 1402 which the user can press in order to have the instances of graphics displayed or not displayed, respectively.

Returning to FIG. 13, in step 1304, if the user responds affirmatively to the prompt, then the facility continues at step 1305, else the facility continues at step 1309 to process any remaining concept matching words occurring on the current slide. In step 1305, the facility determines the representative concept synonym for this concept matching word using the concept table. In step 1306, the facility queries the graphics library for instances of graphics having associated with them the representative synonym determined in step 1305. In step 1307, the facility display the instances of graphics produced by the query of step 1306 and allows the user to select one of the instances of graphics. In step 1308, the facility inserts the instance of graphics selected in step 1307 in the presentation document at the current slide. In step 1309, if words remain on the current slide that have not been searched for concept matching words, the facility continues its step 1302 to advance the pointer to the next concept matching word, else the facility continues in step 1310. In step 1310, the facility displays the slide to which the user requested to move. These steps then conclude.

Figure 15:
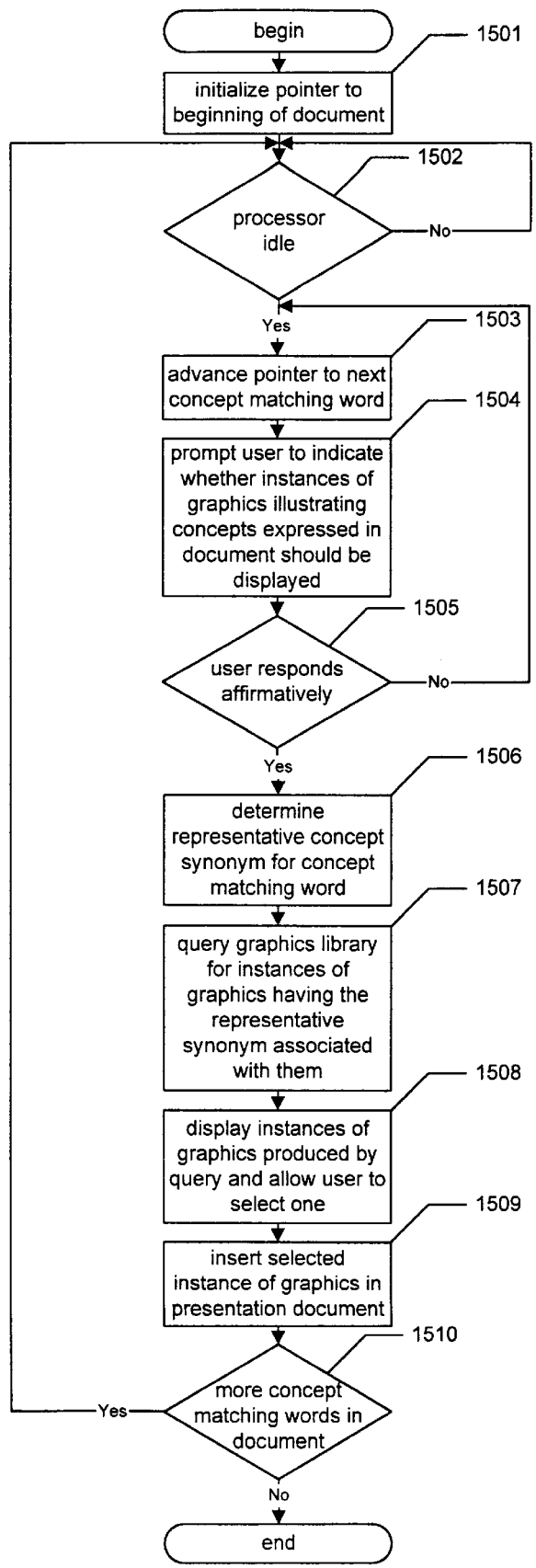
FIG. 15 is a flow diagram showing the steps preferably performed by the facility in the embodiment in which the facility examines words occurring in the document when the computer system's microprocessor is idle.

FIG. 15 is a flow diagram showing the steps preferably performed by the facility in the embodiment in which the facility examines words occurring in the document when the computer system's microprocessor is idle. Those skilled in the art will recognize the general correspondence between the steps shown in FIG. 15 and those shown in FIGS. 5 and 13. In step 1501, the facility initializes a pointer to the beginning of the document. The facility uses this pointer to keep track of the words of the document that have been searched for concept matching words. In step 1502, if the computer system's microprocessor is idle, then the facility continues in step 1503, else the facility continues at step 1502 until the computer system's microprocessor is idle. In step 1503, the facility advances the pointer to the next concept matching word occurring in the document. In step 1504, the facility prompts the user to indicate whether instances of graphics illustrating concepts expressed in the document should be displayed. Step 1504 preferably involves displaying the prompt dialog shown in FIG. 14. In step 1505, if the user responds affirmatively to the prompt, then the facility continues at step 1506, else the facility continues at step 1503 to process the next concept matching word occurring in the document. In step 1506, the facility determines the representative concept synonym for this concept matching word using the concept table. In step 1507, the facility queries the graphics library for instances of graphics having associated with them the representative synonyms determined in step 1506. In step 1508, the facility displays the instances of graphics produced by the query of step 1507 and allows the user to select one of the displayed instances of graphics. In step 1509, the facility inserts the instance of graphics selected in step 1508 in the presentation document at the slide pointed to by the pointer. In step 1510, if the document contains words that have not yet been searched for concept matching words, then the facility continues in step 1502, else these steps conclude.

Figure 16:
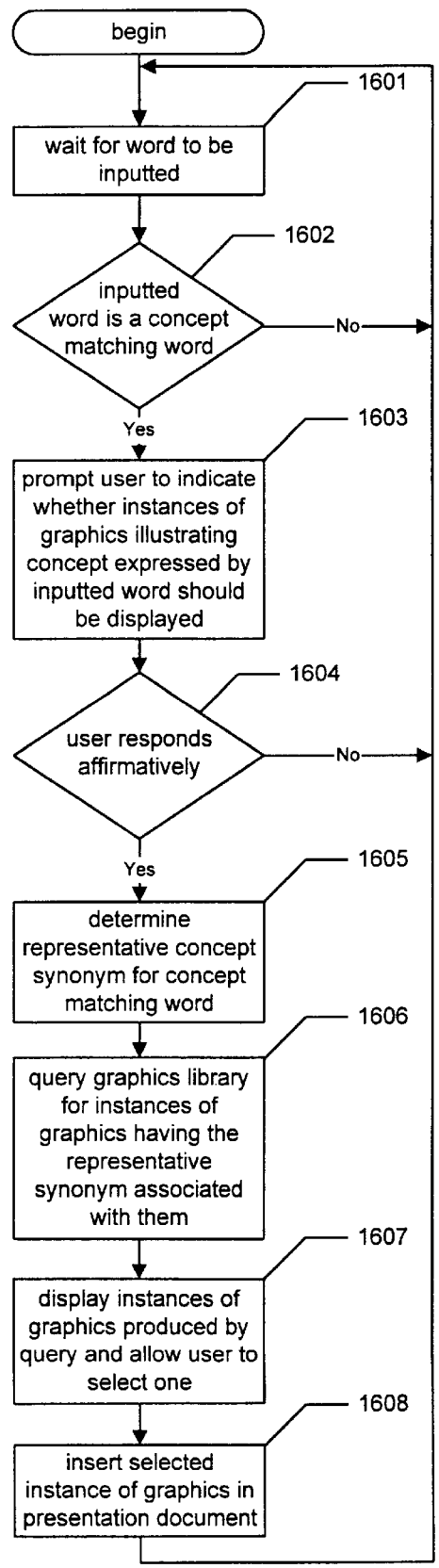
FIG. 16 is a flow diagram showing the steps preferably performed by the facility in the embodiment in which the facility examines each word as if it is inputted by the user.

FIG. 16 is a flow diagram showing the steps preferably performed by the facility in the embodiment in which the facility examines each word as it is inputted by the user. Those skilled in the art will recognize the general correspondence between the steps shown in FIG. 16 and those shown in FIGS. 5, 13, and 14. In step 1601, the facility waits for the user to input a word. Step 1601 preferably involves waiting for the user to type a space or inter-word punctuation character, and selecting as the inputted word the characters between that space or inter-word punctuation character and the previous one. In step 1602, if the inputted word is a concept matching word, then the facility continues in step 1603, else the facility continues at step 1601 to wait for the next inputted word. In step 1603, the facility prompts the user to indicate whether instances of graphics illustrating concepts expressed by the inputted word should be displayed. Step 1603 preferably involves displaying the prompt dialog shown in FIG. 14. In step 1604, if the user responds affirmatively to the prompt, then the facility continues at step 1605, else the facility continues at step 1601 to wait for the next inputted word. In step 1605, the facility determines the representative concept synonym for this concept matching word using the concept table. In step 1606, the facility queries the graphics library for instances of graphics having associated with them the representative synonyms determined in step 1605. In step 1607, the facility displays the instances of graphics produced by the query of step 1606 and allows the user to select one of the displayed instances of graphics. In step 1608, the facility inserts the instance of graphics selected in step 1606 in the presentation document at the current slide. After step 1608, the facility continues at step 1601 to wait for the next inputted word.

The second, third, and fourth embodiments, discussed above in conjunction with FIGS. 13, 14, and 16, each involve examining words in the document on an ongoing basis to identify concepts. In these embodiments, the user preferably may disable the facility so that it discontinues examining words in the document to identify concepts (not shown). This preferably involves adding a button for disabling the facility to the dialogs shown in FIGS. 7 and 14.

Figure 17:
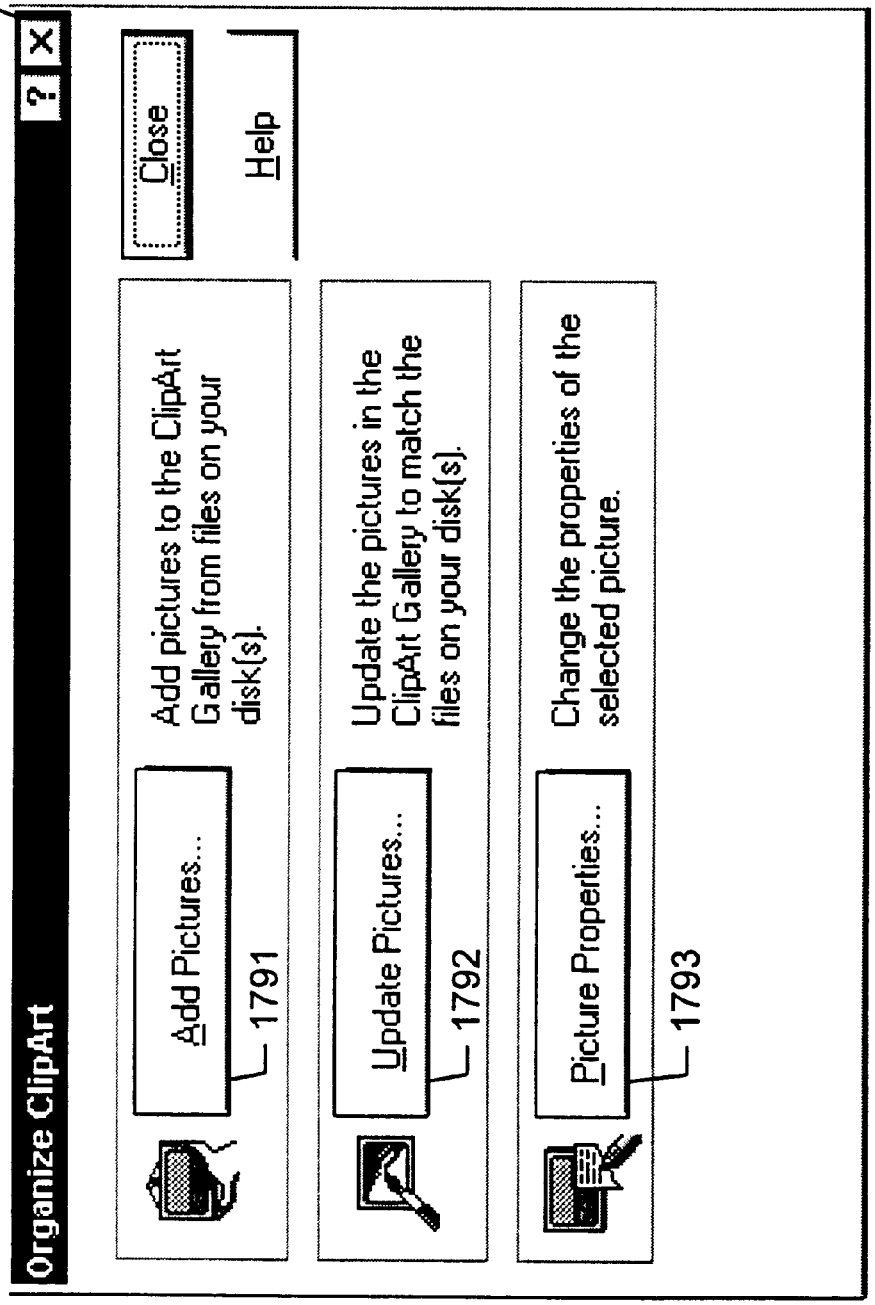
FIG. 17 is a display diagram showing the graphics library modification window.

In addition to being able to customize the concept table as discussed above in conjunction with FIG. 6, the user is also preferably able to modify the contents of the graphics library to change the instances of graphics that are available for insertion by the facility. To do so, the facility preferably displays a graphics library modification window. FIG. 17 is a display diagram showing the graphics library modification window. The graphics library modification window 1790 contains a button 1791 for adding instances of graphics to the library, a button 1792 for replacing instances of graphics in the library, and a button 1793 for changing the descriptive words stored for an instance of graphics in the library. By clicking on button 1791, the user can preferably add additional instances of graphics to the library, specifying for each one or more descriptive words corresponding to representative concept synonyms. By clicking on button 1792, the user can preferably replace existing instances of graphics in the library to, for example, improve the visual quality of these instances of graphics. By clicking on button 1793, the user can preferably change the descriptive words associated with one or more instances of graphics, so that they match additional representative concept synonyms, and therefore concept matching words, or so that they no longer match particular representative concept synonyms, and therefore concept matching words. In the ways described above, the user can tailor the facility to his or her preferences.

While this invention has been shown and described with reference to preferred embodiments, it will be understood by those skilled in the art that various changes or modifications in form and detail may be made without departing from the scope of the invention. For instance, as discussed above, those skilled in the art will appreciate that the facility may automatically add any multimedia artifact to a document to illustrate concepts referred to therein. These include audio sequences and holograms as well as images and video clips. Such multimedia artifacts may also include combinations of other multimedia artifacts, such as a synchronized combination of a video clip and an audio sequence.

We claim:

1. A method in a computer system for selecting a graphic image from a plurality of graphic images, the selected graphic image illustrating a concept expressed by a portion of text contained in a document, so that the selected graphic image can be inserted into the documents the method comprising the steps of:
    (a) automatically identifying a concept expressed by the portion of text in the document that corresponds to a concept represented by at least one of the plurality of graphic images;
    (b) automatically indicating specific graphic images corresponding to said concept identified in step (a); and
    (c) enabling a user to select a graphic image from the specific graphic images to be inserted into the document.

2. The method of claim 1, wherein:
    (a) step (b) includes the step of displaying a visual representation of each of the specific graphic images; and
    (b) step (c) includes the step of receiving a selection request from the user specifying one of the displayed visual representations to indicate the specific graphic image to be inserted into the document.

3. The method of claim 1, wherein the specific graphic images are each represented by a thumbnail image.

4. The method of claim 1, wherein the step of automatically identifying said concept comprises the step of parsing the portion of the text to identify words that correspond to words in a list of concept words.

5. The method of claim 4, further including the steps of:
    (a) displaying the words that were identified; and
    (b) receiving input from a user selecting one of the words that were identified, wherein the step of indicating specific graphic images is based on the word that was selected by the user.

6. The method of claim 4, further comprising the steps of:
    (a) mapping words that were identified to representative synonyms; and
    (b) identifying specific graphic images with which the representative synonyms are associated.

7. The method of claim 1, wherein the selected graphic image is a video clip.

8. The method of claim 1, further comprising the steps of:
    (a) detecting an idle period within the computer system; and
    (b) in response to detecting the idle period, automatically executing steps (a) and (b) of claim 1 to indicates specific graphic images from which the user selects the graphic image to be inserted into the document.

9. The method of claim 1, wherein the document is divided into one or more slides, one of the slides being a slide that is currently being edited, the method further comprising the steps of:
    (a) receiving a request to change the slide currently being edited to another slide or a new slide; and
    (b) in response to the request to change the slide, automatically executing steps (a) and (b) of claim 1 to indicates specific graphic images from which the user selects the graphic image to be inserted into the document.

10. A method in a computer system for selecting a multimedia artifact from a plurality of multimedia artifacts, the selected multimedia artifact illustrating a concept expressed by a portion of text contained in a document, so that the selected multimedia artifact can be inserted into the document, the method comprising the steps of:
    (a) automatically identifying a concept expressed by the portion of the text in the document that corresponds to a concept represented by at least one of the plurality of multimedia artifacts;
    (b) automatically indicating specific multimedia artifacts corresponding to said concept identified in step (a); and
    (c) enabling a user to select a multimedia artifact from the specific multimedia artifacts to be inserted into the document.

11. The method of claim 10, wherein:
    (a) step (b) includes the step of displaying a visual representation of each of the specific multimedia artifacts; and
    (b) step (c) includes the step of receiving a selection request from the user specifying one of the displayed visual representations to indicate the specific multimedia artifact to be inserted into the document.

12. The method of claim 10, wherein the step of automatically identifying said concept comprises the step of parsing the portion of the text to identify words that correspond to words in a list of concept words.

13. The method of claim 12, further including the steps of:
    (a) displaying the words that were identified; and
    (b) receiving input from a user selecting one of the words that were identified, wherein the step of indicating specific multimedia artifacts is based on the word that was selected by the user.

14. The method of claim 12, further comprising the steps of:
    (a) mapping words that were identified to representative synonyms; and
    (b) identifying a specific multimedia artifact with which the representative synonyms are associated.

15. The method of claim 10, wherein the selected multimedia artifact is an audio sequence.

16. A method in a computer system for using a list of concept words to select and add a graphic image to a presentation document from among a plurality of graphic images said graphic image being associated with at least one concept in said list, the method including the steps of:
   (a) enabling a user to enter additional words into the presentation document; and
   (b) evaluating each additional word upon its entry to determine if it occurs in the list of concept words; and if a word that was entered occurs in the list of concept words:
      (i) identifying a graphic image associated with the word that occurs in said list, and
      (ii) adding the graphic image that was identified to the document.

17. The method of claim 16, wherein step (i) includes the steps of:
   (a) identifying a plurality of graphic images, each of which has associated with it the word that occurs in said list;
   (b) displaying a visual indication of each of the plurality of graphic images that was identified;
   (c) receiving a selection request specifying one of the visual indications that was displayed; and
   (d) in response to the selection request, identifying the graphic image indicated by the displayed visual indication specified.

18. The method of claim 16, wherein the graphic image that was identified is a video clip.

19. The method of claim 16 wherein the identified instance of graphics is a visual image.

20. The method of claim 16, wherein the graphic image that was identified is an audio sequence.

21. An apparatus for automatically assisting a user to select and insert a graphic image in a presentation document, said graphic image thus inserted being relevant to a concept expressed by text within the presentation document, the apparatus comprising:
   (a) a presentation document generation module for inserting textual and multimedia content into a presentation document in response to user input;
   (b) a graphics library query module for retrieving graphics images that are relevant to a concept expressed by the text from a graphics library comprising a plurality of graphic images, each graphic image being associated with a concept, the graphics library query module, in response to a request, providing one or more graphic images based on their associated concept, to a requesting module; and
   (c) a conceptual graphic insertion module for detecting that textual content in the presentation document includes a conceptual word, and in response thereto, submitting a request to the graphics library query module for one or more graphic images associated with the conceptual word based on the concept associated with such graphic images, and enabling a user to select a graphic image from said one or more graphic images provided by the graphics library module in the response to the submitted request, to be inserted in the presentation document.

22. The apparatus of claim 21, wherein for detecting that the presentation document generation module has received user input for inserting a conceptual word in the presentation document, the conceptual graphic insertion module includes:
   (a) a concept memory for storing a list of words that represent concepts; and
   (b) a word comparator for comparing words inserted by the presentation document generation module into the presentation document in response to user input to the list of words stored in the concept memory.

23. The apparatus of claim 22, further including a concept memory modification module for modifying the contents of the concept memory in accordance with user input.

24. The apparatus of claim 22, wherein the graphics library query module includes:
   (a) a graphic identification submodule for identifying all graphic images in the graphics library that are associated with the concept; and
   (b) a user graphic selection submodule for displaying a visual indication of each of the graphic images identified by the graphic identification submodule and enabling a user to select one of the graphic images identified by the graphic identification submodule.

25. The apparatus of claim 21, further including a graphics library modification module for modifying the contents of the graphics library in response to user input.

26. The apparatus of claim 25, wherein the graphics library modification module contains a graphics addition submodule for adding to the graphics library a graphic image having one or more concepts associated with it, in response to user input.

27. The apparatus of claim 25, wherein the graphics library modification module contains an associated word modification submodule for modifying the concept associated with a graphic image in the graphics library, in response to user input.

28. A computer-readable medium upon which is stored a presentation creation program comprising machine instructions that can be executed on a computer system to create a presentation document and that enables a user to select a graphic image representing a concept expressed by text contained in the presentation document from a graphics library, the graphics library comprising a plurality of graphic images, each being associated with at least one concept keyword, the computer-readable medium further comprising a list of concept words, each corresponding to a concept keyword, execution of the machine instructions on the computer system causing the program to perform the steps of:
   (a) parsing the document to identify any words that correspond to the words in the list of concept words;
   (b) querying the graphics library for graphic images that are associated with concept keywords corresponding to any words that were identified in step (a);
   (c) displaying any graphic images from the graphics library that satisfy the query; and
   (d) enabling the user to select a graphic image from the graphic images that are displayed, to be inserted in the presentation document.

29. The computer-readable medium of claim 28, wherein the presentation creation program automatically parses the presentation document on a page-by-page basis.

30. The computer-readable medium of claim 28, wherein the presentation creation program performs steps (a)–(c) in response to input from a user.

31. The computer-readable medium of claim 28, wherein the presentation creation program maps each word in the list of concept words to a corresponding lemma form of the word such that a plurality of words in the list of concept words may be mapped to the same lemma form, execution of the machine instructions further causing the presentation creation program to perform the steps of:

(a) displaying a list of the lemma forms to which the identified words are mapped; and (b) receiving user input selecting one of the displayed lemma forms, and wherein the querying step of the presentation creation program includes the step of querying the graphics library for graphic images that are associated with the lemma form that was selected.

32. The computer-readable medium of claim 28, wherein the presentation creation program initially maps from each word in the list of concept words to a corresponding lemma form of the word such that a plurality of words in the list of concept words may be mapped to the same lemma form, and wherein the presentation creation program further maps from each lemma form to a representative synonym such that a plurality of lemma forms may be mapped to the same representative synonym, and wherein execution of the machine instructions further causes the presentation creation program to perform the steps of:

(a) displaying a list of the lemma forms to which the identified words are initially mapped; and (b) receiving user input selecting one of the displayed lemma forms, and wherein the querying step of the presentation creation program includes the step of querying the graphics library for graphic images that have associated with them a concept keyword corresponding to the representative synonym to which the selected lemma form is further mapped.

33. The computer-readable medium of claim 28, wherein the presentation creation program maps from each word in the list of concept words to a representative synonym such that a plurality of words may be mapped to the same representative synonym, and wherein the querying step of the presentation creation program includes the step of querying the graphics library for graphic images that have associated with them a concept keyword corresponding to the representative synonym to which the selected word is mapped.

34. A computer-readable medium upon which is stored a system resource comprising machine instructions that can be executed on a computer system to, in response to a request from an application program, automatically identify graphic images representing a concept expressed by text contained in a document being created by the application program from a graphics library, the graphics library comprising a plurality of graphic images, each being associated with at least one concept keyword, the computer-readable medium further comprising a list of concept words, each corresponding to a concept keyword, execution of the machine instructions on the computer system causing the program to perform the steps of:

(a) parsing the document to identify any words that correspond to the words in the list of concept words;

(b) querying the graphics library for graphic images that are associated with concept keywords corresponding to any words identified in step (a); and (c) returning a representation of each of the graphic images that satisfies the query to the application program.

* * * * *

UNITED STATES PATENT AND TRADEMARK OFFICE
CERTIFICATE OF CORRECTION

PATENT NO. : 6,021,412
DATED : February 1, 2000
INVENTOR(S) : Ho et al.

It is certified that error appears in the above-identified patent and that said Letters Patent is hereby corrected as shown below:

Cover Page, Figure 6     "60" should read --600--

Column 6, line 6     after "to" insert --and--

Column 9, line 37 (Claim 1, line 5)     "documents" should read --document--

Column 10, line 14 (Claim 8, line 5)     "indicates" should read --indicate--

Column 10, line 25 (Claim 9, line 9)     "indicates" should read --indicate--

Column 12, line 10     "Claim 22" should read --Claim 21--

Signed and Sealed this

Twenty-second Day of May, 2001

Attest:

NICHOLAS P. GODICI

Attesting Officer     *Acting Director of the United States Patent and Trademark Office*